Sept. 1, 1942.    J. B. WALKER    2,294,876
COMPARATOR
Filed May 6, 1940
Fig. 1.
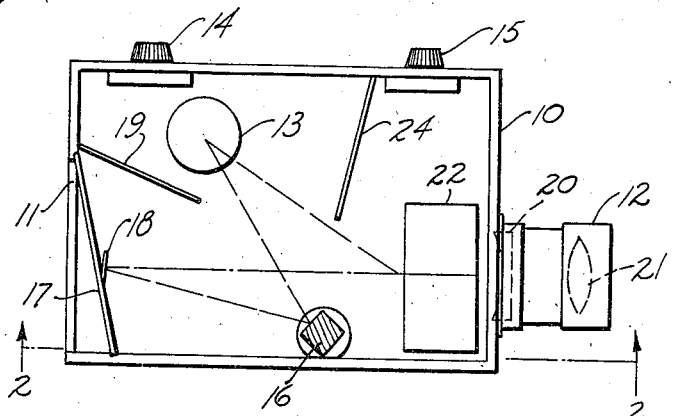
Fig. 2.
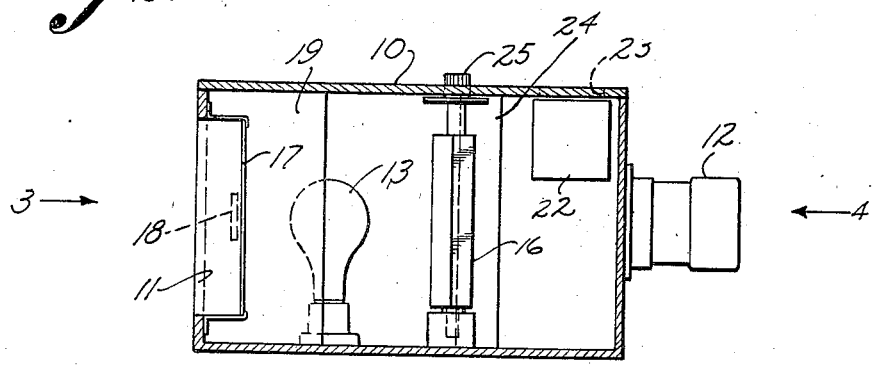
Fig. 3.    Fig. 4.
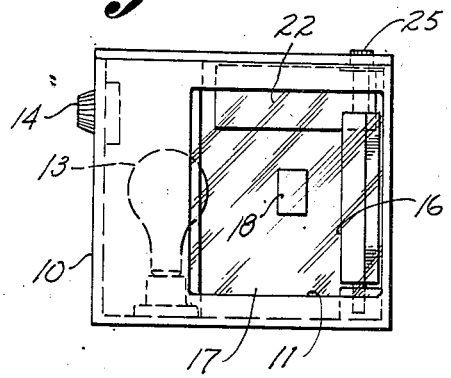  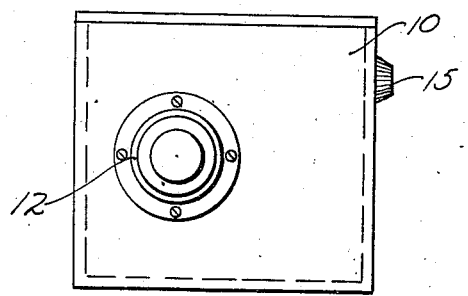
INVENTOR.
Joseph B. Walker,
BY
ATTORNEY.

Patented Sept. 1, 1942

2,294,876

UNITED STATES PATENT OFFICE 2,294,876

COMPARATOR

Joseph B. Walker, Los Angeles, Calif.

Application May 6, 1940, Serial No. 333,471

6 Claims. (Cl. 88—14)

My invention relates generally to devices for comparing shades and tints of colors, and more particularly to such comparators which are adapted to be used in photography.

For some time, a need has existed for a device which would simplify the cinematographer's daily problem of coordinating illumination levels with the tonal values of his subject, usually, of course, the face tones of his principal players. Modern photoelectric light meters, even though they represent a noteworthy forward stride in technique, do not do this.

With a light meter, it is possible to maintain consistent illumination levels, but the meter fails to take into account variations in the tonal value of the subject; and with the extreme sensitivity of today's emulsions, even slight variations in illumination levels and tonal values, so small that a few years ago they were negligible, are now important factors.

In studio cinematography, the key value of any scene is generally the face of the star or some principal player. Lighting, exposure, and processing are all coordinated to keep that face tone at a pleasing, normal rendition. Make-up, too, is a vital part of this chain. Theoretically, the make-up should keep the actual face tone consistent, while the use of a light meter should keep the illumination level consistent. This, with the uniform processing of modern laboratories, should keep the facial rendition on the screen consistently normal and pleasing.

However, with the extreme sensitivity of modern emulsions, this is not always the fact in actual practice. Minor variations in the actual tonal value of face and make-up, often too small to be easily detected by purely visual inspection, can and do produce variations in the photographic rendition of these facial values.

Perhaps the most common variation is the all but imperceptible change during several scenes, or even several "takes" of the same scene, that come as the make-up is retouched and "powdered up." This retouching is, of course, necessary to maintain the desired textural smoothness; but each time it is likely to lighten the tonal value of the face slightly. The alteration is unintentional, it is true, and usually so slight as to escape detection when one glances at it, but nevertheless, the film records the difference.

Inevitably, too, the effect is cumulative. By the end of the day's work, the tone of the make-up may be several shades lighter than it was at the start. It is easy to compensate for this variation if it is seen—a slight reduction or increase in light level will provide the compensation—but the problem is to detect and measure it.

It is, therefore, a major object of my invention to provide a device which will enable a photographer to detect these minor changes in tonal values.

It is another object of my invention to provide such a device which may be easily and quickly used so as to permit comparison of facial tones on the set during the taking of a picture.

It is a further object of my invention to provide a device of this type which is of such a size as to be readily held in the hands, and used to view the actual scene about to be photographed.

These and other objects of my invention will become apparent from the following description of a preferred form thereof, and from the drawing illustrating that form, in which:

Fig. 1 is a plan view of my device with the cover removed,

Fig. 2 is a side elevational view, taken at 2—2 in Fig. 1,

Fig. 3 is an end view taken at 3 in Fig. 2, and

Fig. 4 is an end elevational view taken at 4 in Fig. 2.

The device consists essentially of a housing containing a light source of variable intensity, a member carrying a sample of the make-up used on the principal actor, and an optical system whereby the photographer may compare the sample of make-up lighted by the lamp of variable intensity, with the make-up of the actor lighted by the set lighting.

Thus, in Fig. 1 the numeral 10 indicates a housing of wood or other suitable material having a relatively large opening 11 in one end thereof, preferably located to one side of the center of that end. At the opposite end, and preferably aligned with the opening 11, I provide an eyepiece 12 to be described in detail later. The end of the housing having the opening 11 therein is pointed toward the scene to be checked, and this end is hereinafter referred to as the front or forward end, while the end having the eyepiece 12 is referred to as the rear end of the housing 10.

Near the forward end of the housing 10, and to one side of the aperture 11, I provide a small electric light 13, such for example as a 10 watt frosted globe, connected to any suitable source of power, and controlled by a switch 14 and a rheostat 15 in series with the lamp.

On the side of the housing opposite from the globe 13 and adapted to have the light therefrom fall upon it, I provide a sample carrier 16 consisting of a vertically-disposed rod having a plurality of faces on which may be placed samples of the make-up used on the different principal actors. The sample carrier 16 is preferably placed so as to be out of the line of sight of the eyepiece 12, and hence is not directly visible to the photographer.

To render the sample carrier visible, I provide an angularly-positioned transparent member 17 extending across the opening 11 and having a reflecting member 18 attached at an angle thereto. The member 17 covers the entire opening 11, thus effectively sealing out dust and dirt from the interior of the device, and by positioning it at an angle, so that it faces slightly toward the lamp 13, undesirable reflections within the instrument are reduced to a minimum. In addition, this type of member provides a rigid support for the mirror 18 without requiring the use of relatively fragile wires or other thin members to support the mirror.

The mirror 18 may be plane, but I prefer to make it of a spherically concave shape, for I have found that this provides a larger image and allows of a better focus of the eyepiece. The mirror 18 is preferably mounted on the optical axis of the eyepiece 12, and is set at an angle so that light reflected from the sample holder 16 is reflected by the mirror back along the optical axis and through the eyepiece 12. To prevent direct light from the globe 13 from reaching the member 17, I provide a baffle 19 between the globe and the transparent member, positioned so that the light may fall upon the sample carrier 16.

The eyepiece 12 includes a dispersive element or negative lens 20, and a collective element or positive lens 21. The relative position of these two lenses is adjustable to permit of focusing the device on the scene in question. By combining the negative and positive lenses 20 and 21 in this manner, it is possible to form a virtual image of the scene on which will be superimposed the reflected image of the sample holder 16, thus permitting the two to be readily compared. The use of this type of an optical system forms a sharp virtual image of the scene to be photographed, and this permits the photographer to select any particular portion of that scene and compare it with the image of the sample. For this reason, it is quite important that an eyepiece be provided which will form such a virtual image, for a system, such as a pair of positive lenses, which produces no virtual image would be valueless in attempting to distinguish one actor's face from another's.

With the elements heretofore described, it is possible to make the desired comparisons, as will be described hereinafter, if the voltage supplied the light 13 remains substantially constant. This condition of substantially constant voltage usually prevails on the stages of the large studios; but it often happens that a change must be made from one stage to another, or the cast and photographer must go on location. To take care of such contingencies, in my preferred form, I provide above the eyepiece 12, but vertically aligned with the optical axis thereof, a photoelectric exposure meter 22, preferably of a type having its light-sensitive surface at one end thereof, and its scale on its upper surface. The meter is placed so that light from the lamp 13 falls upon its sensitive surface, and the amount of light thus striking the surface is indicated on the scale of the meter which is visible through an opening 23 in the top of the housing 10. While this will not necessarily be the same amount of light as that which falls on the sample holder 16, there will nevertheless be a constant ratio between the two, and the reading of the meter 22 will thus be proportional to the amount of light falling on the sample holder 16. A baffle 24 permits light to fall upon the cell of the meter 22, while at the same time preventing any light from the lamp 13 from entering the eyepiece 12.

The sample holder 16 may have each of its sides covered with paint or make-up corresponding to the make-up used on each of the principal actors, or, if desired, one of the sides may be colored to match the wall or back drop. In addition, since my comparator may be used to advantage in determining the length of exposure when making enlargements, one of the faces of the sample holder may be colored white or grey to enable the operator to adjust the light falling on the sensitized paper to an amount necessary to provide a predetermined exposure time. The holder 16 is rotatably mounted, and a knob 25 extending through the top of the housing 10 permits the desired side to be selected. If desired, means such as notches may be provided to assure the same angular position for each subsequent setting of that side of the sample holder. This is not essential, but will be found to be of considerable value in securing the proper setting with the minimum of time, since it will be apparent that the illumination of the side will vary as the incident angle of the light varies, in accordance with the well-known cosine law of lighting.

To use the instrument, the scene is lighted as it will be photographed, and the photographer then views the scene through the eyepiece 12 and compares the comparable sample of make-up with the make-up on the actor. For the first scene which is to serve as a standard, the intensity of the light from the globe 13 is varied by means of the rheostat 15 until the sample on the holder 16 matches the make-up on the actor, and the reading on the photocell 22 is then noted. In succeeding scenes, the meter reading is kept at the same value and the set lighting is varied so that the make-up on the actor always matches the sample. In this way, the photographic rendition of the actor's face remains constant, even though the actual shade thereof has been varied. By providing different samples on the sample holder 16 corresponding to the different actors' make-up, the facial tones of these various actors may be maintained constant, and a pleasing, more uniform series of pictures will result. It will be apparent that with my preferred form of instrument, variations in voltage will not affect the use of the apparatus, for the light falling on the photocell constitutes the standard, and inasmuch as this is maintained at a constant value, changes in voltage are automatically compensated for.

The device may be used in black and white or color photography, and is not in any way intended to replace conventional light meters or their use. On the contrary, it is intended to supplement them and to afford a quick and easy means of detecting and correcting the tonal variations which conventional meters are not capable of measuring. Its use in the actual photography of motion pictures has aptly demonstrated its worth.

While I have shown and described a preferred form of my invention, I do not wish to be limited to the particular form or arrangement of parts herein described.

I claim as my invention:

1. An optical comparator for coordinating the illumination of a subject to be photographed with the tonal value thereof, which includes: a housing having an aperture in one wall thereof; a color sample carrier within said housing; means in said housing for simultaneously viewing an opaque color sample on said carrier by reflected light and an independently lighted remote scene visible through said aperture; a light source within said housing adapted to illuminate said color sample; and means for varying the intensity of the light falling on said color sample whereby its tonal value can be matched with that of the subject being photographed.

2. An optical comparator for coordinating the illumination of a subject to be photographed with the tonal value thereof, which includes: a housing having an aperture in one wall thereof; a color sample carrier within said housing; means in said housing for simultaneously viewing an opaque color sample on said carrier by reflected light and an independently lighted remote scene visible through said aperture; a light source within said housing adapted to illuminate said color sample; means for varying the intensity of the light falling on said color sample whereby its tonal value can be matched with that of the subject being photographed; and photo-cell means in said housing positioned to receive light from said light source for proportionately determining the illumination of said color sample, so that it can be subsequently illuminated to the same level whereby said color sample may be used as a standard for relighting said subject for subsequent photographing.

3. An optical comparator for coordinating the illumination of a subject to be photographed with the tonal value thereof, which includes: a housing having an aperture in one wall thereof; a color sample carrier within said housing but to one side of said aperture; a mirror; means within said housing for supporting said mirror behind said aperture and in position to receive reflected light from said color sample; means in said housing for simultaneously viewing said mirror and an independently lighted remote scene visible through said aperture, said mirror reflecting an image of an opaque color sample on said carrier into said viewing means whereby said sample and said remote scene appear immediately adjacent each other and in substantially the same plane; a light source within said housing adapted to illuminate said color sample; and means for varying the intensity of the light falling on said color sample whereby its tonal value can be matched with that of the subject being photographed.

4. An optical comparator for coordinating the illumination of a subject to be photographed with the tonal value thereof, which includes: a housing having an aperture in one wall thereof; a color sample carrier within said housing but to one side of said aperture; a mirror; means within said housing for supporting said mirror behind said aperture; means in said housing for simultaneously viewing said mirror and forming a virtual image of an independently lighted remote scene visible through said aperture, said mirror reflecting an image of a color sample on said carrier into said means whereby said sample and said remote scene appear immediately adjacent each other and in substantially the same plane; a light source within said housing adapted to illuminate said color sample; means for varying the intensity of the light falling on said color sample whereby its tonal value can be matched with that of the subject being photographed; and photocell means in said housing for proportionately determining the illumination of said color sample so that it can be subsequently illuminated to the same level whereby said color sample may be used as a standard for relighting said subject for subsequent photographing.

5. An optical comparator for coordinating the illumination of a subject to be photographed with the tonal value thereof, which includes: a housing having an aperture in one wall thereof; a color sample carrier within said housing but to one side of said aperture; a mirror; means within said housing for supporting said mirror behind said aperture; means in said housing for simultaneously viewing said mirror and forming a virtual image of an independently lighted remote scene visible through said aperture, said means forming sharp, clear images of said scene and said mirror, and said mirror reflecting an image of a color sample on said carrier into said means whereby said color sample and said remote scene appear immediately adjacent each other and in substantially the same plane, and whereby the image of said color sample may be compared to any portion of said scene; a light source within said housing adapted to illuminate said color sample; and means for varying the intensity of the light falling on said color sample whereby its tonal value can be matched with that of the subject being photographed.

6. An optical comparator for coordinating the illumination of a subject to be photographed with the tonal value thereof, which includes: a housing having an aperture in one wall thereof; a color sample carrier within said housing but to one side of said aperture; a mirror; means within said housing for supporting said mirror behind said aperture; means in said housing for simultaneously viewing said mirror and an independently lighted remote scene visible through said aperture, said means forming a virtual image of said scene and said mirror, and said mirror reflecting an image of a color sample on said carrier into said means whereby said color sample and said remote scene appear immediately adjacent each other and in substantially the same plane, and whereby the image of said color sample may be compared to any portion of said scene; a light source within said housing adapted to illuminate said color sample; means for varying the intensity of the light falling on said color sample whereby its tonal value can be matched with that of the subject being photographed; and photocell means in said housing positioned to receive light from said light source for proportionately determining the illumination of said color sample so that it can be subsequently illuminated to the same level whereby said color sample may be used as a standard for relighting said subject for subsequent photographing.

JOSEPH B. WALKER.